United States Patent
Jing et al.

(10) Patent No.: US 10,889,725 B2
(45) Date of Patent: Jan. 12, 2021

(54) SULFONATE-FUNCTIONAL COATINGS AND METHODS

(71) Applicant: 3M INNOVATIVE PROPERTIES COMPANY, St. Paul, MN (US)

(72) Inventors: Naiyong Jing, Woodbury, MN (US); Justin A. Riddle, St. Paul, MN (US); Xue-hua Chen, Shanghai (CN); Erik D. Olson, Shakopee, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 16/194,838

(22) Filed: Nov. 19, 2018

(65) Prior Publication Data

US 2019/0085176 A1    Mar. 21, 2019

Related U.S. Application Data

(62) Division of application No. 15/096,590, filed on Apr. 12, 2016, now Pat. No. 10,160,868, which is a
(Continued)

(51) Int. Cl.
*C09D 5/16* (2006.01)
*C09D 1/00* (2006.01)
(Continued)

(52) U.S. Cl.
CPC .............. *C09D 5/1625* (2013.01); *B05D 5/00* (2013.01); *B05D 7/04* (2013.01); *B05D 7/14* (2013.01); *B05D 7/544* (2013.01); *B08B 1/006* (2013.01); *C03C 17/30* (2013.01); *C09D 1/00* (2013.01); *C09D 1/04* (2013.01); *C09D 5/1662* (2013.01); *C09D 5/1693* (2013.01); *C03C 2217/20* (2013.01); *C03C 2217/75* (2013.01);
(Continued)

(58) Field of Classification Search
None
See application file for complete search history.

(56) References Cited

U.S. PATENT DOCUMENTS

| 4,152,165 A | 5/1979 | Langager |
| 4,338,377 A | 7/1982 | Beck |

(Continued)

FOREIGN PATENT DOCUMENTS

| DE | 10 2006 018216 | 10/2007 |
| EP | 0 933 377 | 8/1999 |

(Continued)

OTHER PUBLICATIONS

Bragg, W.L. and A.B. Pippard, "The Form Birefringence of Macromolecules," *Acta Crystallographica*, 1953; vol. 6, Issue 11-12, p. 865-867.
(Continued)

*Primary Examiner* — Eric W Golightly
(74) *Attorney, Agent, or Firm* — Julie Lapos-Kuchar; Thomas Spielbauer (57) ABSTRACT

A coating composition is disclosed comprising: (i) a non-zwitterionic compound comprising sulfonate-functional groups and (a) alkoxysilane groups and/or (b) silanol-functional groups; (ii) alcohol and/or water; and (iii) a tetraalkoxysilane, oligomers thereof, lithium silicate, sodium silicate, potassium silicate, silica, or combinations thereof.

4 Claims, 1 Drawing Sheet

Related U.S. Application Data division of application No. 13/511,714, filed as application No. PCT/US2010/060915 on Dec. 17, 2010, now Pat. No. 9,340,683.

(60) Provisional application No. 61/287,555, filed on Dec. 17, 2009.

(51) Int. Cl.

| | | |
|---|---|---|
| *C09D 1/04* | (2006.01) | |
| *B05D 5/00* | (2006.01) | |
| *B05D 7/04* | (2006.01) | |
| *B05D 7/14* | (2006.01) | |
| *B05D 7/00* | (2006.01) | |
| *B08B 1/00* | (2006.01) | |
| *C03C 17/30* | (2006.01) | |

(52) U.S. Cl.
CPC ...... *C03C 2218/11* (2013.01); *C03C 2218/32* (2013.01); *Y10T 428/259* (2015.01)

(56) References Cited

U.S. PATENT DOCUMENTS

| | | |
|---|---|---|
| 4,816,333 A | 3/1989 | Lange |
| 5,049,437 A | 9/1991 | Tannenbaum |
| 5,626,907 A | 5/1997 | Hagiwara |
| 5,936,703 A | 8/1999 | Miyazaki |
| 6,040,053 A | 3/2000 | Scholz |
| 6,657,001 B1 | 12/2003 | Anderson |
| 2004/0237833 A1 | 12/2004 | Sepeur |
| 2006/0116482 A1 | 6/2006 | Mundstock |
| 2008/0226928 A1 | 9/2008 | Tanaka |
| 2010/0068392 A1 | 3/2010 | Bauerochse |
| 2010/0249267 A1 | 9/2010 | Jiang |

FOREIGN PATENT DOCUMENTS

| | | |
|---|---|---|
| EP | 1 847 633 A1 | 10/2007 |
| EP | 1 975 208 | 10/2008 |
| JP | 05-112583 | 5/1993 |
| JP | 05-331455 | 12/1993 |
| JP | 07-101965 | 4/1995 |
| JP | 2008-239949 | 10/2006 |
| JP | 2009-079076 | 4/2009 |
| JP | 2009-235130 | 10/2009 |
| KR | 10-0775739 | 11/2007 |
| WO | WO 2004/044062 | 5/2004 |
| WO | WO 2007/146680 | 12/2007 |
| WO | WO 2008/015364 | 2/2008 |
| WO | WO 2009/067565 | 5/2009 |
| WO | WO 2009/119690 | 10/2009 |
| WO | WO 2009/140482 | 11/2009 |
| WO | WO 2009/155308 | 12/2009 |
| WO | WO 2011/084661 | 7/2011 |

OTHER PUBLICATIONS

Lowe et al., "Well-defined Sulfobetaine-based Statistical Copolymers as Potential Anti-bioadherent Coatings," *Journal of Biomedical Materials Research*, 2000, vol. 52, Issue 1, p. 88-94.

Ming et al., "Superhydrophobic Films from Raspberry-like Particles," *Nano Letters*, Nov. 2005, vol. 5, Issue 11, p. 2298-2301.

Paetzold et al., "Suzuki reactions in aqueous multi-phase systems promoted by supported detergents," *Journal of Molecular Catalysis A: Chemical*, 2004, vol. 214, Issue 2, p. 241-247.

Qiu et al., "A Novel Zwitterionic Silane Coupling Agent for Nonthrombogenic Biomaterials," *Chinese Journal of Polymer Science*, 2005, vol. 23, Issue 6, p. 611-617.

Tuzar et al., "Micelles of Hydrophilic-Hydrophobic Poly(sulfobetaine)-Based Block Copolymers," *Macromolecules*, 1997, vol. 30, Issue 8, p. 2509-2512.

PCT International Search Report, PCT/US2010/06915, dated Aug. 29, 2011, 6 pages.

EP Extended Search Report, EP 10842633.9, dated May 16, 2013, 3 pages.

SULFONATE-FUNCTIONAL COATINGS AND METHODS

CROSS REFERENCE TO RELATED APPLICATIONS

This application is a divisional of U.S. application Ser. No. 15/096,590, filed Apr. 12, 2016, now U.S. Pat. No. 10,160,868, issued Dec. 25, 2018, which a divisional of U.S. application Ser. No. 13/511,714, filed May 24, 2012, now U.S. Pat. No. 9,340,683, issued May 17, 2016, which is a national stage filing under 35 U.S.C. 371 of PCT/US2010/060915, filed Dec. 17, 2010, which claims priority to U.S. Provisional Application No. 61/287,555, filed Dec. 17, 2009, the disclosure of which is incorporated by reference in its/their entirety herein.

BACKGROUND

Articles having surfaces capable of being easily cleaned of fingerprints are highly desirable for a variety of uses, particularly surfaces of computer screens, cell phones, and the like. Currently available coating compositions used on such products do not provide a surface from which fingerprints can be easily removed.

SUMMARY

The present disclosure is directed to a coated article having a substrate surface coated with a sulfonate-functional coating. Preferably, such coating includes at least a monolayer of a sulfonate-functional compound. The present disclosure also provides methods, including methods of making a coated substrate (i.e., treating a substrate surface) and methods of removing fingerprints from the coated substrate.

Significantly, for substrates having a sulfonate-functional coating thereon as described herein, a simple application of gentle wiping is all that is needed to remove substantially all of the skin oils deposited as a fingerprint; however, for preferred embodiments water (e.g., tap water at ambient temperature) and/or water vapor (e.g., an individual's breath) and wiping (e.g., up to a few gentle strokes with a tissue, paper towel, cloth) is all that is necessary to remove substantially all of the skin oils deposited as a fingerprint.

In one embodiment, there is provided a method of treating a substrate surface. The method includes: applying a primer coating composition to the substrate surface to form a primed surface comprising nanoparticles; contacting the primed surface with a sulfonate-functional coating composition, wherein the sulfonate-functional coating composition includes a non-zwitterionic compound having sulfonate-functional groups and alkoxysilane groups and/or silanol-functional groups. The method further includes drying the sulfonate-functional coating composition to form a sulfonate-functional coating including at least a monolayer of the sulfonate-functional compound bonded to the primer coating through siloxane bonds; wherein fingerprints are removable from the dried sulfonate-functional coating with water and/or water vapor, and wiping.

In certain embodiments, applying a primer coating composition to the substrate surface involves contacting the substrate surface with a nanoparticle-containing coating composition. The nanoparticle-containing coating composition includes an aqueous dispersion having a pH of less than 5 including silica nanoparticles having average particle diameters of 40 nanometers or less, and an acid having a pKa of ≤3.5. The method further includes drying the nanoparticle-containing coating composition to provide a silica nanoparticle primer coating on the substrate surface. In certain embodiments, if desired, the nanoparticle-containing coating composition further includes a tetraalkoxysilane.

In another embodiment, the present disclosure provides a method of treating a substrate that includes a metal or organic polymeric surface to improve fingerprint removal. The method includes: contacting the metal or organic polymeric surface with a sulfonate-functional coating composition, wherein the sulfonate-functional coating composition includes a non-zwitterionic compound having sulfonate-functional groups and alkoxysilane groups and/or silanol-functional groups; and drying the sulfonate-functional coating composition to form a sulfonate-functional coating. The sulfonate-functional coating includes at least a monolayer of the sulfonate-functional compound bonded to the substrate surface through siloxane bonds.

Advantageously, fingerprints are removable from the dried sulfonate-functional coating with wiping, and preferably with water and/or water vapor and wiping. For example, fingerprints are easily removed from the sulfonate-functional surfaces by simply gently wiping when the surfaces are saturated with water/moisture by breathing.

The present disclosure also provides a hydrophilic article prepared from a method of the disclosure.

In another embodiment, there is provided a coated article that includes a substrate surface, a nanoparticle-containing primer disposed on the substrate surface, and a sulfonate-functional coating bonded to the nanoparticle-containing primer through siloxane bonds. The nanoparticle-containing primer includes agglomerates of a silica nanoparticles having average particle diameters of 40 nanometers or less and silica nanoparticles having average particle diameters of greater than 50 nanometers, said agglomerates comprising a three-dimensional porous network of silica nanoparticles, and the silica nanoparticles are bonded to adjacent silica nanoparticles.

In another embodiment, there is provided a coated article that includes a substrate surface, a nanoparticle-containing primer disposed on the substrate surface, and a sulfonate-functional non-zwitterionic coating bonded to the nanoparticle-containing primer through siloxane bonds. The nanoparticle-containing primer includes agglomerates of silica nanoparticles having average particle diameters of 40 nanometers or less, said agglomerates including a three-dimensional porous network of silica nanoparticles, and the silica nanoparticles are bonded to adjacent silica nanoparticles. In certain embodiments of the coated article, the substrate surface includes a metal surface, a ceramic surface, an organic polymeric surface, or a combination thereof. In certain embodiments of the coated article, the substrate surface includes a metal surface, an organic polymeric surface, or a combination thereof.

In certain embodiments of the coated article, the sulfonate-functional coating includes at least a monolayer of a sulfonate-functional compound bonded to the nanoparticle-containing primer through siloxane bonds.

In certain embodiments of the coated article, the nanoparticle-containing primer coating is 100 angstroms (Å) to 10,000 Å thick. In certain embodiments of the coated article, the sulfonate-functional coating is no greater than 10 microns thick, and often no greater than 1 micron thick.

The present disclosure also provides methods of removing fingerprints from a surface.

In one embodiment of removing fingerprints from a surface, the method includes: receiving a coated article including a substrate surface that includes a nanoparticle-containing primer disposed on the substrate surface, and a sulfonate-functional non-zwitterionic coating bonded to the nanoparticle-containing primer through siloxane bonds; and removing fingerprints from the sulfonate-functional surface by wiping the fingerprints.

In some embodiments, the methods of removing fingerprints from the sulfonate-functional surface include applying water and/or water vapor to the fingerprints and wiping.

In another embodiment, the present disclosure provides a coating composition that includes: a non-zwitterionic compound including sulfonate-functional groups and alkoxysilane groups and/or silanol-functional groups; alcohol and/or water; and a tetraalkoxysilane, oligomers thereof, lithium silicate, sodium silicate, potassium silicate, silica, or combinations thereof.

Definitions

The terms "comprises" and variations thereof do not have a limiting meaning where these terms appear in the description and claims.

The words "preferred" and "preferably" refer to embodiments of the disclosure that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the invention.

As used herein, "a," "an," "the," "at least one," and "one or more" are used interchangeably.

As used herein, the term "or" is generally employed in its sense including "and/or" unless the content clearly dictates otherwise. The term "and/or" means one or all of the listed elements or a combination of any two or more of the listed elements.

As used herein, all numbers are assumed to be modified by the term "about" and preferably by the term "exactly." Notwithstanding that the numerical ranges and parameters setting forth the broad scope of the invention are approximations, the numerical values set forth in the specific examples are reported as precisely as possible. All numerical values, however, inherently contain certain errors necessarily resulting from the standard deviation found in their respective testing measurements.

Also herein, the recitations of numerical ranges by endpoints include all numbers subsumed within that range (e.g., 1 to 5 includes 1, 1.5, 2, 2.75, 3, 3.80, 4, 5, etc.).

The term "in the range" or "within a range" (and similar statements) includes the endpoints of the stated range.

Groupings of alternative elements or embodiments disclosed herein are not to be construed as limitations. Each group member may be referred to and claimed individually or in any combination with other members of the group or other elements found therein. It is anticipated that one or more members of a group may be included in, or deleted from, a group for reasons of convenience and/or patentability. When any such inclusion or deletion occurs, the specification is herein deemed to contain the group as modified thus fulfilling the written description of all Markush groups used in the appended claims.

When a group is present more than once in a formula described herein, each group is "independently" selected, whether specifically stated or not. For example, when more than one Y group is present in a formula, each Y group is independently selected. Furthermore, subgroups contained within these groups are also independently selected. For example, when each Y group contains an R, then each R is also independently selected.

As used herein, the term "organic group" means a hydrocarbon group (with optional elements other than carbon and hydrogen, such as oxygen, nitrogen, sulfur, and silicon) that is classified as an aliphatic group, cyclic group, or combination of aliphatic and cyclic groups (e.g., alkaryl and aralkyl groups). In the context of the present disclosure, the organic groups are those that do not interfere with the formation of a wipe-away fingerprint surface. The term "aliphatic group" means a saturated or unsaturated linear or branched hydrocarbon group. This term is used to encompass alkyl, alkenyl, and alkynyl groups, for example. The term "alkyl group" means a saturated linear or branched hydrocarbon group including, for example, methyl, ethyl, isopropyl, t-butyl, heptyl, dodecyl, octadecyl, amyl, 2-ethylhexyl, and the like. The term "alkylene group" is a divalent alkyl group. The term "alkenyl group" means an unsaturated, linear or branched hydrocarbon group with one or more carbon-carbon double bonds, such as a vinyl group. The term "alkynyl group" means an unsaturated, linear or branched hydrocarbon group with one or more carbon-carbon triple bonds. The term "cyclic group" means a closed ring hydrocarbon group that is classified as an alicyclic group, aromatic group, or heterocyclic group. The term "alicyclic group" means a cyclic hydrocarbon group having properties resembling those of aliphatic groups. The term "aromatic group" or "aryl group" means a mono- or polynuclear aromatic hydrocarbon group. The term "heterocyclic group" means a closed ring hydrocarbon in which one or more of the atoms in the ring is an element other than carbon (e.g., nitrogen, oxygen, sulfur, etc.). A group that may be the same or different is referred to as being "independently" something.

Substitution is anticipated on the organic groups of the complexes of the present disclosure. As a means of simplifying the discussion and recitation of certain terminology used throughout this application, the terms "group" and "moiety" are used to differentiate between chemical species that allow for substitution or that may be substituted and those that do not allow or may not be so substituted. Thus, when the term "group" is used to describe a chemical substituent, the described chemical material includes the unsubstituted group and that group with O, N, Si, or S atoms, for example, in the chain (as in an alkoxy group) as well as carbonyl groups or other conventional substitution. Where the term "moiety" is used to describe a chemical compound or substituent, only an unsubstituted chemical material is intended to be included. For example, the phrase "alkyl group" is intended to include not only pure open chain saturated hydrocarbon alkyl substituents, such as methyl, ethyl, propyl, t-butyl, and the like, but also alkyl substituents bearing further substituents known in the art, such as hydroxy, alkoxy, alkylsulfonyl, halogen atoms, cyano, nitro, amino, carboxyl, etc. Thus, "alkyl group" includes ether groups, haloalkyls, nitroalkyls, carboxyalkyls, hydroxyalkyls, sulfoalkyls, etc. On the other hand, the phrase "alkyl moiety" is limited to the inclusion of only pure open chain saturated hydrocarbon alkyl substituents, such as methyl, ethyl, propyl, t-butyl, and the like.

The term "primary particle size" refers to the average size of unagglomerated single particles of silica.

As used herein, "hydrophilic" is used to refer to a surface that is wet by aqueous solutions, and does not express whether or not the layer absorbs aqueous solutions. Surfaces on which drops of water or aqueous solutions exhibit a static water contact angle of less than 50° are referred to as "hydrophilic". Hydrophobic substrates have a water contact angle of 50° or greater.

As used herein, "at least a monolayer of a sulfonate-functional compound" includes a monolayer or a thicker layer of molecules, covalently bonded (through siloxane bonds) to the surface or primer on the surface of a substrate, wherein such molecules are derived from the sulfonate-functional compound. If the sulfonate-functional compound includes dimers, trimers, or other oligomers of individual molecules, then "at least a monolayer" would include a monolayer of such dimers, trimers, or other oligomers, or a mixture of such oligomers with monomers.

The above summary of the present disclosure is not intended to describe each disclosed embodiment or every implementation of the present invention. The description that follows more particularly exemplifies illustrative embodiments. In several places throughout the application, guidance is provided through lists of examples, which examples can be used in various combinations. In each instance, the recited list serves only as a representative group and should not be interpreted as an exclusive list.

DETAILED DESCRIPTION OF ILLUSTRATIVE EMBODIMENTS

The present disclosure is directed to a coated article having a substrate surface coated with a layer of a sulfonate-functional coating. Preferably, such coating includes at least a monolayer of a sulfonate-functional compound.

Significantly, fingerprints can be easily removed from the sulfonate-functional coating of the present disclosure with wiping, preferably after first applying water and/or water vapor (e.g., by breathing) to the fingerprints. Typically, methods of the present disclosure include removing fingerprints (by this it is meant, substantially all the skin oils deposited as a fingerprint) from the sulfonate-functional surface by simply applying water (e.g., tap water at room temperature) and/or water vapor (e.g., a person's breath) and wiping. Herein, "wiping" refers to gentle wiping, typically by hand, with for example, a tissue, paper towel, or a cloth, without significant pressure (e.g., generally, no more than 350 grams) for one or more strokes or rubs (typically, only a few are needed).

In particular, in one embodiment, there is provided a coated article that includes a substrate surface, a primer (preferably, a nanoparticle-containing primer) disposed on the substrate surface, and a sulfonate-functional coating disposed on the primed surface. See, for example, FIG. 1.

Figure 1:
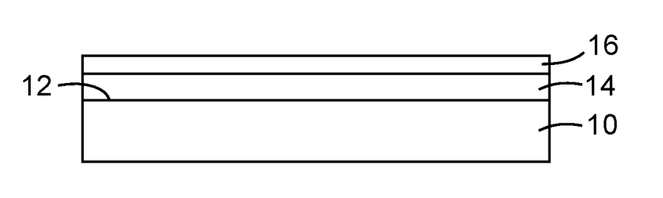
FIG. 1 shows a substrate having a surface on which is coated a primer and a sulfonate-functional coating thereon, according to one embodiment of the invention.

FIG. 1 which shows a substrate 10 having a surface 12 on which is coated a primer coating 14 and a sulfonate-functional coating 16 thereon, according to one embodiment of the invention. The sulfonate-functional coating is preferably applied in a monolayer thickness, but can be as thick as 10 microns. The primer coating is preferably within a range of 100 angstroms (Å) to 10,000 Å thick, and frequently 500 Å to 2500 Å thick.

Siloxane (Si—O—Si) bonds are used to chemically bind the sulfonate functionality to the surface, whether it be directly to the substrate surface or to a primer coating thereon. Preferably, the presence of three siloxane bonds for each surface sulfonate group makes the chemical bond relatively more stable than if one or two siloxane bonds were formed.

In one particular embodiment, a coated article includes a substrate surface, a nanoparticle-containing primer disposed on the substrate surface, and a sulfonate-functional coating bonded to the nanoparticle-containing primer through siloxane bonds.

The nanoparticle-containing primer includes agglomerates of silica nanoparticles having average particle diameters of 40 nanometers or less, said agglomerates including a three-dimensional porous network of silica nanoparticles, and the silica nanoparticles are bonded to adjacent silica nanoparticles.

In one embodiment, there is provided a method of treating a substrate surface. The method includes: applying a primer coating composition to the substrate surface to form a primed surface having —OH groups thereon; contacting the primed surface having —OH groups thereon with a sulfonate-functional coating composition, wherein the sulfonate-functional coating composition includes an organic compound having sulfonate-functional groups and alkoxysilane groups and/or silanol-functional groups. The method further includes drying the sulfonate-functional coating composition to form a sulfonate-functional coating including at least a monolayer of the sulfonate-functional compound bonded to the primer coating through siloxane bonds; wherein fingerprints are removable from the dried sulfonate-functional coating by wiping, or preferably by applying water and/or water vapor (e.g., by breathing) with wiping. In certain embodiments, the sulfonate-functional organic compound is a zwitterionic compound and in certain embodiments, it is a non-zwitterionic compound.

The sulfonate-functional coating compositions of the present disclosure can be used on a variety of substrate surfaces, including for example, a metal surface, an organic polymeric surface, or a combination thereof. The method includes: contacting the metal or organic polymeric surface with a sulfonate-functional coating composition, wherein the sulfonate-functional coating composition includes an organic compound having sulfonate-functional groups and alkoxysilane groups and/or silanol-functional groups; and drying the sulfonate-functional coating composition to form a sulfonate-functional coating. The sulfonate-functional coating includes at least a monolayer of the sulfonate-functional compound bonded to the substrate surface through siloxane bonds. In certain embodiments, the sulfonate-functional organic compound is a zwitterionic compound and in certain embodiments, it is a non-zwitterionic compound.

Advantageously, fingerprints are removable from the dried sulfonate-functional coating with wiping, and preferably with water and/or water vapor and wiping. For example, fingerprints are easily removed from the sulfonate-functional surfaces by simply gently wiping when the surfaces are saturated with water/moisture by breathing.

Thus, the methods of the present disclosure can be used to prepare a hydrophilic article on a surface of a wide variety of substrates, thereby providing "wipe-away fingerprint surfaces." Such surface is one having a sulfonate-functional coating thereon that can be cleaned of substantially all the skin oils deposited as a fingerprint by a simple application of gentle wiping with a cloth, paper towel, tissue, or the like. Preferably, such "wipe-away fingerprint surfaces" are those that can be cleaned of substantially all the skin oils deposited as a fingerprint by wiping, or preferably by applying water (e.g., tap water at ambient temperature) and/or water vapor (e.g., an individual's breath) and wiping (e.g., up to a few gentle strokes with a tissue, paper towel, cloth).

In certain embodiments of the coated article, the sulfonate-functional coating includes at least a monolayer of a sulfonate-functional compound bonded to the substrate surface through siloxane bonds. In certain embodiments of the coated article, the sulfonate-functional coating includes at least a monolayer of a sulfonate-functional compound bonded to a primer through siloxane bonds. In certain embodiments of the coated article, the sulfonate-functional coating includes at least a monolayer of a sulfonate-functional compound bonded to a nanoparticle-containing primer through siloxane bonds. The present disclosure also provides a hydrophilic article prepared from a method of the disclosure.

The present disclosure also provides methods of removing fingerprints from a surface.

Generally, such methods include: receiving a coated article including a substrate surface that optionally includes a primer (e.g., a nanoparticle-containing primer) disposed on the substrate surface, and a sulfonate-functional coating bonded to the substrate surface or the primer through siloxane bonds; and removing fingerprints from the sulfonate-functional surface by wiping the fingerprints. Preferably, the methods of removing fingerprints from the sulfonate-functional surface include applying water and/or water vapor to the fingerprints and wiping.

In another embodiment, the present disclosure provides a coating composition that includes: an organic compound (in certain embodiments, a zwitterionic compound, and in certain embodiments, a non-zwitterionic compound) including sulfonate-functional groups and alkoxysilane groups and/or silanol-functional groups; alcohol and/or water; and a tetraalkoxysilane, oligomers of tetraalkoxysilanes, lithium silicate, sodium silicate, potassium silicate, silica (e.g., silica particles such as silica nanoparticles), or combinations thereof.

Sulfonate-Functional Coating

The sulfonate-functional coating can be prepared from sulfonate-functional compounds. These compounds have an alkoxysilane- and/or silanol-functional group for bonding to a substrate surface. They also include a sulfonate group ($SO_3^-$) for rendering hydrophilicity to the substrate surface.

For certain embodiments, the sulfonate-containing compounds are zwitterionic and for certain embodiments, they are non-zwitterionic.

Examples include non-zwitterionic sulfonate-organosilanol compounds such as those disclosed in U.S. Pat. No. 4,152,165 (Langager et al.) and U.S. Pat. No. 4,338,377 (Beck et al.).

In certain embodiments, the non-zwitterionic sulfonate-organosilanol compounds used in the solutions and compositions of the present disclosure have the following Formula (I):

wherein:
each Q is independently selected from hydroxyl, alkyl groups containing from 1 to 4 carbon atoms and alkoxy groups containing from 1 to 4 carbon atoms;
M is selected from hydrogen, alkali metals, and organic cations of strong organic bases having an average molecular weight of less than 150 and a pKa of greater than 11;
X is an organic linking group;
Y is selected from hydrogen, alkaline earth metals (e.g., magnesium, calcium, etc.), organic cations of protonated weak bases having an average molecular weight of less than 200 and a pKa of less than 11 (e.g., 4-aminopyridine, 2-methoxyethylamine, benzylamine, 2,4-dimethylimidazole, 3-[2-ethoxy(2-ethoxyethoxy)]propylamine), alkali metals, and organic cations of strong organic bases having an average molecular weight of less than 150 and a pKa of greater than 11 (e.g., $^+N(CH_3)_4$, $^+N(CH_2CH_3)_4$), provided that M is hydrogen when Y is selected from hydrogen, alkaline earth metals and organic cations of said protonated weak bases;
r is equal to the valence of Y; and
n is 1 or 2.

Preferably, the non-zwitterionic compound of Formula (I) is an alkoxysilane compound (e.g., wherein Q is an alkoxy group containing from 1 to 4 carbon atoms).

The weight percentage of oxygen in these compounds of Formula (I) is at least 30%, and preferably at least 40%. Most preferably it is in the range of 45% to 55%. The weight percentage of silicon in these compounds is no greater than 15%. Each of these percentages is based on the weight of the compound in the water-free acid form.

The organic linking group X of Formula (I) is preferably selected from alkylene groups, cycloalkylene groups, alkyl-substituted cycloalkylene groups, hydroxy-substituted alkylene groups, hydroxy-substituted mono-oxa alkylene groups, divalent hydrocarbon groups having mono-oxa backbone substitution, divalent hydrocarbon groups having mono-thia backbone substitution, divalent hydrocarbon groups having monooxo-thia backbone substitution, divalent hydrocarbon groups having dioxo-thia backbone substitution, arylene groups, arylalkylene groups, alkylarylene groups and substituted alkylarylene groups. Most preferably X is selected from alkylene groups, hydroxy-substituted alkylene groups and hydroxy-substituted mono-oxa alkylene groups.

Suitable examples of non-zwitterionic compounds of Formula (I) are described in U.S. Pat. No. 4,152,165 (Langager et al.) and U.S. Pat. No. 4,338,377 (Beck et al.), and include, for example, the following:

Examples of zwitterionic sulfonate-functional compounds include those disclosed in U.S. Pat. No. 5,936,703 (Miyazaki et al.) and International Publication Nos. WO 2007/146680 and WO 2009/119690.

In certain embodiments, the zwitterionic sulfonate-organosilanol compounds used in the solutions and compositions of the present disclosure have the following Formula (II) wherein:

wherein:
each $R^1$ is independently a hydrogen, methyl group, or ethyl group;

each $R^2$ is independently a methyl group or an ethyl group;

each $R^3$ and $R^4$ is independently a saturated or unsaturated, straight chain, branched, or cyclic organic group, which may be joined together, optionally with atoms of the group W, to form a ring;

W is an organic linking group;

p and m are integers of 1 to 3;

q is 0 or 1; and p+q=3.

The organic linking group W of Formula (II) is preferably selected from saturated or unsaturated, straight chain, branched, or cyclic organic groups. The linking group W is preferably an alkylene group, which may include carbonyl groups, urethane groups, urea groups, heteroatoms such as oxygen, nitrogen, and sulfur, and combinations thereof. Examples of suitable linking groups W include alkylene groups, cycloalkylene groups, alkyl-substituted cycloalkylene groups, hydroxy-substituted alkylene groups, hydroxy-substituted mono-oxa alkylene groups, divalent hydrocarbon groups having mono-oxa backbone substitution, divalent hydrocarbon groups having mono-thia backbone substitution, divalent hydrocarbon groups having monooxo-thia backbone substitution, divalent hydrocarbon groups having dioxo-thia backbone substitution, arylene groups, arylalkylene groups, alkylarylene groups and substituted alkylarylene groups.

Suitable examples of zwitterionic compounds of Formula (II) are described in U.S. Pat. No. 5,936,703 (Miyazaki et al.) and International Publication Nos. WO 2007/146680 and WO 2009/119690, and include the following zwitterionic functional groups (—W—N$^+$(R$^3$)(R$^4$)—(CH$_2$)$_m$—SO$_3^-$):

Sulfoalkyl imidazolium salts

Sulfoaryl imidazolium salts

Sulfoalkyl pyridinium salts

Sulfoalkyl ammonium salts (sulfobetaine)

Sulfoalkyl piperidinium salts

In certain embodiments, the sulfonate-organosilanol compounds used in the solutions and compositions of the present disclosure have the following Formula (III) wherein:

$$(R^1O)_p—Si(R^2)_q—CH_2CH_2CH_2—N^+(CH_3)_2—(CH_2)_m—SO_3^- \quad (III)$$

wherein:

each $R^1$ is independently a hydrogen, methyl group, or ethyl group;

each $R^2$ is independently a methyl group or an ethyl group;

p and m are integers of 1 to 3;

q is 0 or 1; and p+q=3.

Suitable examples of zwitterionic compounds of Formula (III) are described in U.S. Pat. No. 5,936,703 (Miyazaki et al.), including, for example:

(CH$_3$O)$_3$Si—CH$_2$CH$_2$CH$_2$—N$^+$(CH$_3$)$_2$—CH$_2$CH$_2$CH$_2$—SO$_3^-$; and

(CH$_3$CH$_2$O)$_2$Si(CH$_3$)—CH$_2$CH$_2$CH$_2$—N$^+$(CH$_3$)$_2$—CH$_2$CH$_2$CH$_2$—SO$_3^-$.

Other examples of suitable zwitterionic compounds, which can be made using standard techniques that are exemplified in the Examples Section, include the following:

Preferred examples of suitable sulfonate-functional compounds for use in preparing coating compositions and coatings of the present disclosure are described in the Experimental Section.

The sulfonate-functional coating composition typically includes a sulfonate-functional compound in an amount of at least 0.1 wt-%, and often at least 1 wt-%, based on the total weight of the coating composition. The sulfonate-functional coating composition typically includes a sulfonate-functional compound in an amount of no greater than 20 wt-%, and often no greater than 5 wt-%, based on the total weight of the coating composition. Generally, for monolayer coating thicknesses, relatively dilute coating compositions are used. Alternatively, relatively concentrated coating compositions can be used and subsequently rinsed.

The sulfonate-functional coating composition preferably includes alcohol, water, or hydroalcoholic solutions (i.e., alcohol and/or water). Typically, such alcohols are lower alcohols (e.g., $C_1$ to $C_8$ alcohols, and more typically $C_1$ to $C_4$ alcohols), such as methanol, ethanol, propanol, 2-propanol, etc. Preferably, the sulfonate-functional coating compositions are aqueous solutions. As it is used herein, the term "aqueous solution" refers to solutions containing water. Such solutions may employ water as the only solvent or they may employ combinations of water and organic solvents such as alcohol and acetone. Organic solvents may also be included in the hydrophilic treatment compositions so as to improve their freeze-thaw stability. Typically, the solvents are present in an amount up to 50% by weight of the compositions and preferably in the range of 5-50% by weight of the compositions.

The sulfonate-functional coating composition can be acidic, basic, or neutral. The performance durability of the coatings can be affected by pH. For example, coating compositions containing sulfonate-functional zwitterionic compounds are preferably neutral.

The sulfonate-functional coating compositions may be provided in a variety of viscosities. Thus, for example, the viscosity may vary from a water-like thinness to a paste-like heaviness. They may also be provided in the form of gels. Additionally, a variety of other ingredients may be incorporated in the compositions.

Thus, for example, conventional surfactants, cationic, anionic, or nonionic surfactants can be used. Detergents and wetting agents can also be used. Typically, anionic surfactants, detergents, and wetting agents such as those described below for the Primer Composition are also useful in the sulfonate-functional coating compositions of the disclosure.

In certain embodiments, the sulfonate-functional coating composition further includes a tetraalkoxysilane (e.g., tetraethylorthosilicate (TEOS)), oligomers thereof, such as alkyl polysilicates (e.g., poly(diethoxysiloxane)), lithium silicate, sodium silicate, potassium silicate, silica (e.g., silica particles), or combinations thereof, which can provide enhanced durability. In some embodiments, the amount of such coupling agent included in the coating composition should be limited in order to prevent destruction of the anti-reflective or anti-fog properties of the coating. The optimal amount of coupling agent is determined experimentally and is dependent on the coupling agent's identity, molecular weight and refractive index. The coupling agent (s), when present, are typically added to the composition at levels of 0.1 to 20 percent by weight of the coating composition, and more preferably 1 to 15 percent by weight of the coating composition.

Sulfonate-functional coating compositions are preferably coated on the article using conventional techniques, such as bar, roll, curtain, rotogravure, spray, or dip coating techniques. The preferred methods include bar and roll coating, or air knife coating to adjust thickness.

The sulfonate-functional coatings of the present disclosure are preferably applied in a monolayer thickness. Typically, the sulfonate-functional coating is no greater than 10 microns thick, and preferably no greater than 1 micron thick, as measured using an ellipsometer such as a Gaertner Scientific Corp Model No. L115C.

Sulfonate-functional coatings of the present disclosure can be coated on both sides of a substrate if desired. Alternatively, the coatings of the present disclosure may be coated on one side of the substrate. Once coated, the sulfonate-functional article is typically dried at temperatures of 20° C. to 150° C. in a recirculating oven. An inert gas may be circulated. The temperature may be increased further to speed the drying process, but care must be exercised to avoid damage to the substrate.

The sulfonate-functional coating compositions provide anti-fog properties to surfaces coated therewith. The anti-fog property is demonstrated by the tendency of the coatings to resist the formation of water droplets which tend to significantly reduce the transparency of the coated substrate. Water vapor from, for example, human breathing, tends to condense upon the coated substrate in the form of a thin uniform water film, rather than as water droplets. Such a uniform film does not significantly reduce the clarity or transparency of the substrate.

Primer Coating

In certain embodiments of the present disclosure, a primer coating is formed on a substrate surface. Such primer coating provides —OH groups on the substrate surface. Preferably, such primer coating is formed from a nanoparticle-containing coating composition that is coated and dried on a substrate surface.

Other primer compositions or processes can be used to provide —OH groups. Examples of such compositions include a tetraalkoxysilane, oligomers thereof, lithium silicate, sodium silicate, potassium silicate, silica (e.g., silica particles), or combinations thereof. In certain embodiments, the described surface in this disclosure can be surface modified by the conventional vapor coating or vapor deposition process to create SiO or $SiO_2$ thin layer primers described in U.S. Pat. No. 4,338,377. Surface modification of substrates may also include vapor coating or vapor deposition of alkoxysilanes. Although the following discussion focuses on nanoparticle-containing primer coatings, various features described (e.g., coating thickness) apply to other primer coatings.

In certain embodiments, the nanoparticle-containing primer coating composition includes an aqueous dispersion having a pH of less than 5 comprising silica nanoparticles having average particle diameters of 40 nanometers or less, and an acid having a pKa of ≤3.5 (preferably <2.5, most preferably less than 1).

In another embodiment, the nanoparticle-containing primer coating composition comprises silica nanoparticles having a bi-modal distribution.

These acidified silica nanoparticle primer coating compositions, can be coated directly onto hydrophobic organic and inorganic substrates without either organic solvents or surfactants. The wetting property of these inorganic nanoparticle aqueous dispersions on hydrophobic surfaces such as polyethylene terephthalate (PET) or polycarbonate (PC) is a function of the pH of the dispersions and the pKa of the acid. The primer coating compositions are coatable on hydrophobic organic substrates when they are acidified with HCl to pH=2 to 3, and even to 5 in some embodiments. In contrast, the primer coating compositions bead up on the organic substrates at neutral or basic pH.

Inorganic silica sols in aqueous media are well known in the art and available commercially. Silica sols in water or water-alcohol solutions are available commercially under such trade names as LUDOX (manufactured by E.I. duPont de Nemours and Co., Inc., Wilmington, Del.), NYACOL (available from Nyacol Co., Ashland, Mass.) or NALCO (manufactured by Ondea Nalco Chemical Co., Oak Brook, Ill.). One useful silica sol is NALCO 2326 available as a silica sol with mean particle size of 5 nanometers, pH 10.5, and solid content 15% by weight. Other commercially available silica nanoparticles include "NALCO 1115" and "NALCO 1130," commercially available from NALCO Chemical Co., "Remasol SP30," commercially available from Remet Corp., and "LUDOX SM," commercially available from E.I. Du Pont de Nemours Co., Inc., and Snowtex ST-OUP, Snowtex ST-UP, Snowtex ST-PS-S available from Nissan Chemical Co.

Non-aqueous silica sols (also called silica organosols) may also be used and are silica sol dispersions wherein the liquid phase is an organic solvent, or an aqueous organic solvent. In the practice of this disclosure, the silica sol is chosen so that its liquid phase is typically aqueous or an aqueous organic solvent. However, it has been observed that sodium stabilized silica nanoparticles should first be acidified prior to dilution with an organic solvent such as ethanol. Dilution prior to acidification may yield poor or non-uniform coatings. Ammonium stabilized silica nanoparticles may generally be diluted and acidified in any order.

The primer coating composition contains an acid or combination of acids, each having a pKa ($H_2O$) of ≤3.5, preferably <2.5, most preferably less than 1. Useful acids include both organic and inorganic acids and may be exemplified by oxalic acid, citric acid, $H_2SO_3$, $H_3PO_4$, $CF_3CO_2H$, HCl, HBr, HI, $HBrO_3$, $HNO_3$, $HClO_4$, $H_2SO_4$, $CH_3SO_3H$, $CF_3SO_3H$, $CF_3CO_2H$, and $CH_3SO_2OH$. Most preferred acids include HCl, $HNO_3$, $H_2SO_4$, and $H_3PO_4$. In some embodiments, it is desirable to provide a mixture of an organic and inorganic acid. In some embodiments one may use a mixture of acids comprising those having a pKa≤3.5 (preferably ≤2.5, most preferably less than 1), optionally with minor amounts of other acids having pKa's>0. It has been found that weaker acids having a pKa of >4, such as acetic acid, do not provide a uniform coatings having the desirable properties of transmissivity, cleanability, and/or durability. In particular, primer coating compositions with weaker acids such as acetic acid typically bead up on the surface of a substrate.

The primer coating composition generally contains sufficient acid to provide a pH of less than 5, preferably less than 4, most preferably less than 3. In some embodiments, it has been found that the pH of the coating composition can be adjusted to pH 5-6 after reducing the pH to less than 5. This allows one to coat pH-sensitive substrates.

Tetraalkoxy coupling agents, particularly tetraalkoxysilanes, such as tetraethylorthosilicate (TEOS), and oligomeric forms of tetraalkoxysilane, such as alkyl polysilicates (e.g., poly(diethoxysiloxane)), may also be useful to improve binding between silica nanoparticles. The amount of coupling agent included in the coating composition should be limited in order to prevent destruction of the anti-reflective or anti-fog properties of the coating. The optimal amount of coupling agent is determined experimentally and is dependent on the coupling agent's identity, molecular weight and refractive index. The coupling agent(s), when present, are typically added to the composition at levels of 0.1 to 50 percent by weight (wt-%) of the silica nanoparticle concentration, and more preferably 1 to 15 percent by weight of the silica nanoparticles.

The primed article includes a substrate surface bearing a continuous network of silica nanoparticles agglomerates.

In one embodiment, the particles preferably have an average primary particle size of 40 nanometers or less, preferably 20 nanometers or less, and more preferably 10 nanometers or less. The smaller nanoparticles, those of 20 nanometers or less, generally provide better primer coatings, when acidified, without the need for additives such as tetraalkoxysilanes, surfactants or organic solvents. Further, the nanoparticles generally have a surface area greater than 150 $m^2$/gram, preferably greater than 200 $m^2$/gram, and more preferably greater than 400 $m^2$/gram. The particles preferably have narrow particle size distributions, that is, a polydispersity (i.e., particle size distribution) of 2.0 or less, preferably 1.5 or less. If desired, larger silica particles may be added, in amounts that do not deleteriously decrease the coatability of the composition on a selected substrate.

In another embodiment, the particles preferable have at least a bimodal distribution with a silica nanoparticles having average particle diameters of 40 nanometers or less and silica nanoparticles having average particle diameters of greater than 50 nanometers. The silica nanoparticles may have average particle diameters up to 500 nanometers. In one embodiment, the bimodal distribution of silica nanoparticles has a first distribution in a range from 2 nanometers to 15 nanometers and a second distribution in a range from 20 nanometers to 500 nanometers; a first distribution in a range from 2 nanometers to 20 nanometers and a second distribution in a range from 30 nanometers to 500 nanometers or even a first distribution in a range from 5 nanometers to 15 nanometers and a second distribution in a range from 20 nanometers to 100 nanometers. In another aspect, in some embodiments, the weight ratio of the first distribution of nanoparticles to the second distribution of nanoparticles is in a range from 1:99 to 99:1; 10:90 to 90:10; 20:80 to 80:20; or even 30:70 to 70:30. In one embodiment, the weight ratio of the first distribution of nanoparticles to the second distribution of nanoparticles is in a range from 1:99 to 99:1.

The nanosilica described in this disclosure may be spherical or nonspherical. The silica nanoparticles are preferably not surface modified.

The average particle size may be determined using transmission electron microscopy. As used herein, the term "continuous" refers to covering the surface of the substrate with virtually no discontinuities or gaps in the areas where the gelled network is applied. The term "network" refers to an aggregation or agglomeration of nanoparticles linked together to form a porous three-dimensional network. The term agglomerates as used herein refers to linking together (or sintering) of the nanoparticles as shown and described in FIG. 1 of WO 2009/140482. The term "primary particle size" refers to the average size of unagglomerated single particles of silica.

The term "porous" refers to the presence of voids between the silica nanoparticles created when the nanoparticles form a continuous coating. For single layer primer coatings, it is known that in order to maximize light transmission in air through an optically transparent substrate, and minimize reflection by the substrate, the refractive index of the coating should equal as closely as possible the square root of the refractive index of the substrate, and the thickness of the coating should be approximately one-fourth (¼) of the optical wavelength of the incident light. The voids in the coating provide a multiplicity of subwavelength interstices between the silica nanoparticles where the index of refraction (RI) abruptly changes from that of air (RI=1) to that of the metal oxide particles (e.g., for silica RI=1.44). By adjusting the porosity, a primer coating having a calculated index of refraction (as shown in U.S. Pat. No. 4,816,333 (Lange, et al.)) very close to the square root of the refractive index of the substrate can be created. By utilizing primer coatings having optimal indices of refraction at coating thicknesses equal to approximately one-fourth the optical wavelength of the incident light, the percent transmission of light through the coated substrate is maximized and reflection is minimized.

Preferably, the network has a porosity of 25 to 45 volume percent, more preferably 30 to 40 volume percent, when dried. In some embodiments the porosity may be higher. Porosity may be calculated from the refractive index of the coating according to published procedures such as in W. L. Bragg, A. B. Pippard, Acta Crystallographica, volume 6, page 865 (1953). With silica nanoparticles, this porosity provides a coating having an index of refraction of 1.2 to 1.4, preferably 1.25 to 1.36, which is approximately equal to the square root of the refractive indices of polyester, polycarbonate, and poly(methyl methacrylate) substrates. For example, a porous silica nanoparticle primer coating having a refractive index of 1.25 to 1.36 is capable of providing a highly anti-reflective surface when coated on a polyethylene terephthalate substrate (RI=1.64) at a thickness of 1000-2000 Å. Primer coating layer thicknesses may be higher, e.g., as high as a few microns or mils thick, depending on the application, such as for easy-clean of removal of undesired particulates, rather than antireflection. The mechanical properties may be expected to be improved when the coating thickness is increased.

In order to uniformly coat a primer composition onto a hydrophobic substrate from an aqueous system it may be desirable to increase the surface energy of the substrate and/or reduce the surface tension of the coating composition. The surface energy may be increased by oxidizing the substrate surface prior to coating using corona discharge or flame treatment methods. These methods may also improve adhesion of the coating to the substrate. Other methods capable of increasing the surface energy of the article include the use of primers such as thin coatings of polyvinylidene chloride (PVDC). Alternatively, the surface tension of the coating composition may be decreased by addition of lower alcohols ($C_1$ to $C_8$). In some instances, however, in order to improve the coating hydrophilicity for desired properties and to ensure uniform coating of the article from an aqueous or hydroalcoholic solution, it may be beneficial to add a wetting agent, which is typically a surfactant, to the primer composition.

The term "surfactant" as used herein describes molecules comprising hydrophilic (polar) and hydrophobic (non-polar) regions on the same molecule which are capable of reducing the surface tension of the coating solution. Useful surfactants may include those disclosed in U.S. Pat. No. 6,040,053 (Scholz et al.).

For typical concentrations of silica nanoparticles (e.g., 0.2 to 15 percent by weight relative to the total coating composition) most surfactants comprise less than 0.1 percent by weight of the coating composition, preferably 0.003 to 0.05 percent by weight, in order to preserve the anti-reflective properties of the coating. It should be noted that with some surfactants a spotty coating is attained at concentrations in excess of what is needed to achieve the anti-fog property.

Anionic surfactants in the primer coating composition are preferred when added to improve the uniformity of the resulting coatings. Useful anionic surfactants include, but are not limited to, those with molecular structures comprising (1) at least one hydrophobic moiety, such as $C_6$-$C_{20}$ alkyl, alkylaryl, and/or alkenyl groups, (2) at least one anionic group, such as sulfate, sulfonate, phosphate, polyoxyethylene sulfate, polyoxyethylene sulfonate, polyoxyethylene phosphate, and the like, and/or (3) the salts of such anionic groups, wherein said salts include alkali metal salts, ammonium salts, tertiary amino salts, and the like. Representative commercial examples of useful anionic surfactants include sodium lauryl sulfate, available under the trade name TEXAPON L-100 from Henkel Inc., Wilmington, Del., or under the trade name POLYSTEP B-3 from Stepan Chemical Co, Northfield, Ill.; sodium lauryl ether sulfate, available under the trade name POLYSTEP B-12 from Stepan Chemical Co., Northfield, Ill.; ammonium lauryl sulfate, available under the trade name STANDAPOL A from Henkel Inc., Wilmington, Del.; and sodium dodecyl benzene sulfonate, available under the trade name SIPONATE DS-10 from Rhone-Poulenc, Inc., Cranberry, N.J.

Where the primer coating composition does not include a surfactant or when improved coating uniformity is desirable, it may be beneficial to add another wetting agent, including those that do not impart durable anti-fog properties, in order to ensure uniform coating of the article from an aqueous or hydroalcoholic solution. Examples of useful wetting agents include polyethoxylated alkyl alcohols (e.g. "Brij™ 30," and "Brij™ 35," commercially available from ICI Americas, Inc., and "Tergitol™ TMN-6™ Specialty Surfactant," commercially available from Union Carbide Chemical and Plastics Co., polyethoxylated alkylphenols (e.g., "Triton™ X-100" from Union Carbide Chemical and Plastics Co., "Iconol™ NP-70" from BASF Corp.) and polyethylene glycol/polypropylene glycol block copolymer (commercially available as "Tetronic™ 1502 Block Copolymer Surfactant," "Tetronic™ 908 Block Copolymer Surfactant" and "Pluronic™ F38 Block Copolymer Surfactant," all from BASF, Corp.). Of course, any added wetting agent must be included at a level which will not destroy the anti-reflective or anti-fog properties of the coating, if such features are desired. Generally the wetting agent is used in amounts of less than 0.1 percent by weight of the coating composition, preferably 0.003 to 0.05 percent by weight of the coating composition depending on the amount of silica nanoparticles. Rinsing or steeping the coated article in water may be desirable to remove excess surfactant or wetting agent.

Primer coating compositions are preferably coated on the article using conventional techniques, such as bar, roll, curtain, rotogravure, spray, or dip coating techniques. The preferred methods include bar and roll coating, or air knife coating to adjust thickness. In order to ensure uniform coating and wetting of the film, it may be desirable to oxidize the substrate surface prior to coating using corona discharge or flame treatment methods. Other methods capable of increasing the surface energy of the article include the use of primers such as polyvinylidene chloride (PVDC).

The primer coatings of the present disclosure are preferably applied in uniform average thicknesses varying by less than 200 Å, and more preferably by less than 100 Å, in order to avoid visible interference color variations in the coating. The optimal average dry coating thickness is dependent upon the particular primer coating composition, but in general the average thickness of the coating is 100 Å to 10,000 Å, preferably 500 to 2500 Å, more preferably 750 to 2000 Å, and even more preferably 1000 to 1500 Å, as measured using an ellipsometer such as a Gaertner Scientific Corp Model No. L115C. Above and below this range, the anti-reflective properties of the coating may be significantly diminished. It should be noted, however, that while the average coating thickness is preferably uniform, the actual coating thickness can vary considerably from one particular point on the coating to another. Such variation in thickness, when correlated over a visibly distinct region, may actually be beneficial by contributing to the broad band anti-reflective properties of the coating.

Primer coatings of the present disclosure can be coated on both sides of a substrate if desired. Alternatively, the coatings of the present disclosure may be coated on one side of the substrate.

Once coated, the primed article is typically dried at temperatures of 20° C. to 150° C. in a recirculating oven. An inert gas may be circulated. The temperature may be increased further to speed the drying process, but care must be exercised to avoid damage to the substrate. For inorganic substrates, the cure temperature can be above 200° C. After the primer coating composition is applied to the substrate and dried, the coating comprises preferably from 60 to 95 percent by weight (more preferably from 70 to 92 percent by weight) of silica nanoparticles (typically agglomerated), from 0.1 to 20 percent by weight (more preferably from 10 to 25 percent by weight) tetraalkoxysilanes and optionally 0 to 5 percent by weight (more preferably from 0.5 to 2 percent by weight) surfactant, and optionally up to 5 percent by weight (preferably 0.1 to 2 percent by weight) wetting agent.

When the primer coating compositions of the disclosure are applied to substrates to provide anti-reflection properties, glare is reduced by increasing the light transmission of the coated substrate. Preferably, the primed substrate exhibits an increase in transmission of normal incident light of at least 3 percentage points and up to as much as 10 percentage points or more, when compared to an uncoated substrate, at 550 nm (e.g., the wavelength at which the human eye displays peak photo-optic response). The percent transmission is dependent upon the angle of incidence and the wavelength of light and is determined using ASTM test method D1003-92, entitled "Haze and Luminous Transmittance of Transparent Plastics." Preferably, the coated substrates display an increase in percent transmission of greater than 3 percent, more preferably greater than 5 percent, and most preferably greater than 8 percent when compared with an uncoated substrate, using 550 nm light. When the desired usage involves significant "off-axis" (i.e. non-normal) viewing or unwanted reflections, gains in visibility may be greater especially where the reflections approach or exceed in brightness the object in view.

When antireflection coating is not required, the primer coating thickness can be 1 to 10 microns.

In some embodiments the primer coating composition itself provides a tough, abrasion resistant layer that protects the substrate and the underlying graphic display from damage from causes such as scratches, abrasion and solvents.

In many embodiments, the primer coating compositions of the present disclosure are shelf stable, e.g., they do not gel, opacify, or otherwise deteriorate significantly. Further, in many embodiments, the primed articles are durable and abrasion resistant.

Coated Articles

In some embodiments, articles of the disclosure comprise a substrate, preferably having a primed surface, which may be of virtually any construction, transparent to opaque, polymeric, glass, ceramic, or metal, having a flat, curved, or complex shape, and preferably having formed thereon a continuous network of agglomerated silica nanoparticles.

Preferred primer and sulfonate-functional coating compositions of the present disclosure provide hydrophilicity to a substrate. They are also both useful in imparting anti-fog properties to substrates coated therewith. And, for certain embodiments, they both can impart anti-reflection to substrates coated therewith.

The polymeric substrates may comprise polymeric sheet, film, or molded material. In some embodiments, where increased transmissivity is desired, the substrate is transparent. The term transparent means transmitting at least 85% of incident light in the visible spectrum (400-700 nm wavelength). Transparent substrates may be colored or colorless.

In other embodiments, where increased hydrophilicity is desired, the substrate may be initially hydrophobic. The compositions may be applied to a wide variety of substrates by a variety of coating methods. As used herein, "hydrophilic" is used to refer to a surface that it is wet by aqueous solutions, and does not express whether or not the layer absorbs aqueous solutions. Surfaces on which drops of water or aqueous solutions exhibit a static water contact angle of less than 50° are referred to as "hydrophilic." Hydrophobic substrates have a water contact angle of 50° or greater.

Substrates to which the coating compositions of the disclosure can be applied are preferably transparent or translucent to visible light. Preferred substrates are made of polyester (e.g., polyethylene terephthalate, polybutyleneterephthalate), polycarbonate, allyldiglycolcarbonate, polyacrylates, such as polymethylmethacrylate, polystyrene, polysulfone, polyethersulfone, homo-epoxy polymers, epoxy addition polymers with polydiamines, polydithiols, polyethylene copolymers, fluorinated surfaces, cellulose esters such as acetate and butyrate, glass, ceramic, organic and inorganic composite surfaces and the like, including blends and laminates thereof.

In other embodiments, the substrate need not be transparent. It has been found that the composition provides easily cleanable surfaces to substrates such as flexible films used in graphics and signage. Flexible films may be made from polyesters such as PET or polyolefins such as PP (polypropylene), PE (polyethylene) and PVC (polyvinyl chloride) are particularly preferred. The substrate can be formed into a film using conventional filmmaking techniques such as extrusion of the substrate resin into a film and optional uniaxial or biaxial orientation of the extruded film. The substrate can be treated to improve adhesion between the substrate and the primer coating, using, e.g., chemical treatment, corona treatment such as air or nitrogen corona, plasma, flame, or actinic radiation. If desired, an optional tie layer can also be applied between the substrate and the primer coating composition to increase the interlayer adhesion. The other side of the substrate may also be treated using the above-described treatments to improve adhesion between the substrate and an adhesive. The substrate may be provided with graphics, such as words or symbols as known in the art.

In still other embodiments, the substrate can be a metal or have a metal surface (e.g., vapor deposited metals) such as aluminum or stainless steel.

Typically the substrate is in the form of a film, sheet, panel or pane of material and may be a part of an article such as a computer case, a cell phone case, a computer screen, a cell phone screen, ophthalmic lenses, architectural glazings, decorative glass frames, motor vehicle windows and windshields, and protective eye wear, such as surgical masks and face shields. The coatings may, optionally if desired, cover only a portion of the article, e.g., only the section immediately adjacent the eyes in a face shield may be coated. The substrate may be flat, curved or shaped. The article to be coated may be produced by blowing, casting, extrusion, or injection molding.

Articles such as disposable surgical face masks and face shields which are coated with the anti-reflective, anti-fog compositions of this disclosure are preferably stored in single use packages which reduce environmental exposure and contamination which can result in decreased anti-fog properties. Reusable articles are preferably used in combination with a package that protects or completely seals the product from environmental exposure when not in use. The material used to form the packages should be comprised of a non-contaminating material. It has been found that certain materials can result in partial or total elimination of the anti-fog properties. While not being bound by any theory, it is currently believed that materials which contain plasticizers, catalysts, and other low molecular weight materials which can volatilize on aging are sorbed into the coating and result in a decrease in the anti-fog property.

Accordingly, the disclosure provides protective eyewear, such as surgical masks and face shields, as well as ophthalmic lenses, windows and windshields which have anti-reflective and anti-fog properties. Furthermore, cell phone and computer components are provided which have wipe-away fingerprint surfaces.

Ideally, the sulfonate-functional coating provides easy removal of fingerprints (i.e., wipe-away fingerprint surfaces). Significantly, for certain embodiments, a simple application of gentle wiping is all that is needed to remove substantially all of the skin oils deposited as a fingerprint; however, for preferred embodiments water (e.g., tap water at ambient temperature) and/or water vapor (e.g., an individual's breath) and wiping (e.g., up to a few gentle strokes with a tissue, paper towel, cloth) is all that is necessary to remove substantially all of the skin oils deposited as a fingerprint.

EXAMPLES

Objects and advantages of various embodiments of this invention are further illustrated by the following examples, but the particular materials and amounts thereof recited in these examples, as well as other conditions and details, should not be construed to unduly limit this invention. These examples are merely for illustrative purposes only and are not meant to be limiting on the scope of the appended claims.

All parts, percentages, ratios, etc. in the examples and the rest of the specification are by weight, unless noted otherwise. Solvents and other reagents used were obtained from Aldrich Chemical Company, Milwaukee, Wis. unless otherwise noted.

Materials

Polycarbonate (PC) substrates were prepared from "Lexan™ 101" available from Sabic Innovative Plastics, Pittsfield, Mass.

Polyethylene terephthalate (PET) substrates were prepared from "Scothpar™" available from 3M Company, St. Paul, Minn. and flashlamp treated using conventional methods.

Aluminum (Al) substrates were prepared from 18 gauge aluminum 5052 available from McMaster-Carr of Robbinsville, N.J.

Stainless steel (SS) substrates were prepared from 26 gauge 304 stainless steel available from McMaster-Carr of Robbinsville, N.J.

Float glass plates were obtained from Cardinal Glass of Eden Prairie, Minn. Artificial sebum was obtained from WFK-Testgewebe GmbH, Germany.

"Polystep™ A-18" (linear sodium alpha olefin sulfonate) was obtained from Stepan Company, Northfield, Ill.

"Biosoft™ D-40" (linear sodium alkylbenzene sulfonate) was obtained from Stepan Company, Northfield, Ill.

NALCO 8691 is 13.3% solids (nominally 13 percent solids) aqueous colloidal spherical silica dispersion, available as NALCO 8691 from NALCO Chemical Company, Naperville, Ill.

NALCO 2326 is 16.2% solids (nominally 16 percent solids) aqueous colloidal spherical silica dispersion, available as NALCO 2326 from NALCO Chemical Company, Naperville, Ill.

Nissan Snowtex ST-OUP is 15.8% solids (nominally 16 percent solids) aqueous colloidal nonspherical silica dispersion, available as Snowtex ST-OUP from Nissan Chemical Company, Houston, Tex.

NPS1: A 2.5 wt-% solution of [Nalco 8691: Polystep A-18 (99:1 w/w)] in water and was acidified with 1.5 M $HNO_3$ to pH=2.

NPS2: A 5 wt-% solution of [Nalco 8691: Polystep A-18 (99:1 w/w)] in water and was acidified with 1.5 M $HNO_3$ to pH=2.

NPS3: A 2 wt-% solution of [Nalco 2326: Nissan ST-OUP: Biosoft™ D-40 (59.6:39.4:1 w/w)] in water and was acidified with 1.5 M $HNO_3$ to pH=3.

Methanol was obtained from VWR International, West Chester, Pa.

Tetrahydrofuran (THF) was obtained from VWR International, West Chester, Pa.

Diethyl ether was obtained from VWR International, West Chester, Pa.

Dichloromethane was obtained from VWR International, West Chester, Pa.

1,3-Propane sultone was obtained from Aldrich Chemical, St. Louis, Mo.

1,4-butane sultone was obtained from Aldrich Chemical, St. Louis, Mo.

3-(N,N-dimethylaminopropyl)trimethoxysilane was obtained from Gelest, Morrisville, Pa.

2-(4-Pyridylethyl)triethoxysilane was obtained from Gelest, Morrisville, Pa.

3-Hydroxy-1-propanesulfonic acid sodium salt was obtained from Aldrich Chemical, St. Louis, Mo.

3-(N,N-diethylaminopropyl)trimethoxysilanewas obtained from Gelest, Morrisville, Pa.

7-Bromoheptyltrimethoxysilane was obtained from Gelest, Morrisville, Pa.

Dimethylamine (2M in Methanol) was obtained from Alfa Aesar, Ward Hill, Mass.

3-(Triethoxysilyl)propylisocyanate was obtained from Aldrich Chemical, St. Louis, Mo.

N,N-dimethylethylenediamine was obtained from Aldrich Chemical, St. Louis, Mo.

1,3-bis(dimethylamino)-2-propanol was obtained from Aldrich Chemical, St. Louis, Mo.

2-(2-Dimethylaminoethoxy)ethanol was obtained from TCI America, Portland, Oreg.

Lithisil™ 25 (lithium silicate) was obtained from PQ Corporation, Valley Forge, Pa.

Unless otherwise noted, all parts, percentages, ratios, etc. in the examples and the rest of the specification are by weight.

Preparative Example 1

Preparation of

Coating Solution 3-(N,N-dimethylaminopropyl)trimethoxysilane (3.0 grams (g), 14.5 millimoles (mmol)) was added to a screw-top jar followed by anhydrous THF (10 g). To the mixture, 1,3-propane sultone (1.8 g, 14.5 mmol) was added over 40 minutes. The combined reaction mixture was warmed to 65° C. and mixed for a period of 14 hours. The solvent was removed from the reaction mixture by evaporation and the solid was diluted to 1 wt-% in methanol.

Preparative Example 2

Preparation of

Coating Solution 3-(N,N-dimethylaminopropyl)trimethoxysilane (3.0 g, 14.5 mmol) was added to a screw-top jar followed by DI water (5.0 g). 1,3-Propane sultone (1.8 g, 14.5 mmol) was added to the mixture over a period of 15 minutes. The combined reaction mixture was warmed to 65° C. and mixed for a period of 14 hours. The reaction mixture was diluted to 2 wt-% in water to obtain the final coating solution.

Preparative Example 3

Preparation of

Coating Solution 3-(N,N-dimethylaminopropyl)trimethoxysilane (49.7 g, 239 mmol) was added to a screw-top jar followed by deionized (DI) water (82.2 g) and 1,4-butane sultone (32.6 g, 239 mmol). The combined reaction mixture was warmed to 75° C. and mixed for a period of 14 hours. The reaction mixture was diluted to 2 wt-% in water to obtain the final coating solution.

Preparative Example 4

Preparation of

Coating Solution 2-(4-Pyridylethyl)triethoxysilane (2.0 g, 7.0 mmol) was added to a screw-top jar followed by DI water (5.0 g). 1,3-Propane sultone (0.9 g, 7.0 mmol) was added to the mixture over a period of 15 minutes. The combined reaction mixture was warmed to 65° C. and mixed for a period of 14 hours. The reaction mixture was diluted to 2 wt-% in water to obtain the final coating solution.

Preparative Example 5

Preparation of

Coating Solution 3-(N,N-dimethylaminopropyl)trimethoxysilane (5.0 g, 24.1 mmol) was added to a screw-top jar followed by DI water (9.7 g) followed by 3-hydroxy-1-propanesulfonic acid sodium salt (4.7 g, 24.1 mmol). The combined reaction mixture was warmed to 65° C. and mixed for a period of 14 hours. The reaction mixture was diluted to 2 wt-% in water to obtain the final coating solution.

Preparative Example 6

Preparation of

Coating Solution 3-(N,N-diethylaminopropyl)trimethoxysilane (3.0 g, 14.5 mmol) was added to a screw-top jar followed by anhydrous THF (10 g). To the mixture, 1,3-propane sultone (1.8 g, 14.5 mmol) was added over 15 minutes. The combined reaction mixture was warmed to 65° C. and mixed for a period of 14 hours. The solvent was removed from the reaction mixture by evaporation and the solid was diluted to 1 wt-% in methanol. When water was used as a solvent instead of THF, the fingerprint cleaning performance was reduced.

Preparative Example 7

Preparation of

Coating Solution

7-Bromoheptyltrimethoxysilane (5.0 g, 16.7 mmol) was added to a screw-top vial along with dimethylamine (2.0 M in methanol, 20 milliliters (mL)) and heated to 75° C. for a period of 14 hours. After concentration of the reaction mixture by evaporation, diethyl ether was added and the mixture was filtered and concentrated to yield 7-(N,N-dimethylaminopropyl)trimethoxysilane. A screw-top vial was charged with 7-(N,N-dimethylaminopropyl)trimethoxysilane (1.0 g, 3.8 mmol) and anhydrous THF (3.0 g). To the reaction vessel, 1,3-propane sultone (0.5 g, 3.8 mmol) was added over a period 10 minutes. The combined reaction mixture was heated to 75° C. for a period of 7.5 hours. The solvent was removed from the reaction mixture and the solid was diluted to 1 wt-% in methanol. When water was used as a solvent instead of THF the fingerprint cleaning performance was reduced.

Preparative Example 8

Preparation of

Coating Solution

A screw-top vial was charged with N,N-dimethylethylenediamine (0.85 g, 9.6 mmol) and anhydrous THF (9 mL). To the reaction vessel 3-(triethoxysilyl) propylisocyanate (2.60 g, 10.6 mmol) was added over a period of 5 minutes. After the reaction was mixed at room temperature for 2 hours, 1,3-propane sultone (1.30 g, 10.6 mmol) was added. The reaction was allowed to mix at room temperature for 12 hours before the solid was filtered from the mixture and dried. The solid was dissolved (1%) in warm methanol for coating.

Preparative Example 9

Preparation of

Coating Solution

A screw-top vial was charged with 2-(2-dimethylaminoethoxy)ethanol (1.3 g, 9.6 mmol) and 3-(triethoxysilyl) propylisocyanate (2.50 g, 10.1 mmol), and subsequently warmed to 60° C. for 14 hours. The reaction mixture was cooled to room temperature before addition of THF (5 mL) and 1,3-propane sultone (1.30 g, 10.6 mmol). The reaction was allowed to mix at 60° C. for 8 hours before the solid was filtered from the mixture and dried. The solid was dissolved (1%) in warm methanol for coating.

Preparative Example 10

Preparation of

Coating Solution

A screw-top vial was charged with 1,3-bis(dimethylamino)-2-propanol (1.4 g, 9.6 mmol) and 3-(triethoxysilyl) propylisocyanate (2.50 g, 10.1 mmol), and subsequently warmed to 60° C. for 14 hours. The reaction mixture was cooled to room temperature before addition of dichloromethane (5 mL) and 1,3-propane sultone (2.80 g, 23.0 mmol). The reaction was allowed to mix at 60° C. for 8 hours before the solid was filtered from the mixture and dried. The solid was dissolved (2%) in water for coating.

Preparative Example 11

Preparation of

Coating Solution

Preparative Example 11 was prepared as described in U.S. Pat. No. 4,338,377 and diluted to 2 wt-%.

Preparative Example 12

Preparation of

Coating Solution

Preparative Example 12 was prepared as described in U.S. Pat. No. 4,338,377 and diluted to 2 wt-%.

Preparative Example 13

Preparative Example 13 coating solution was prepared by neutralizing a 2% solution of Preparative Example 11 with NaOH (1.0 M) to pH=7.

Preparative Example 14

Preparative Example 14 coating solution was prepared as a 2.5 wt-% solution of [Lithisil™ 25 lithium silicate: compound of Preparatory Example 3 (50:50 w/w)] in water.

Preparative Example 15

Preparative Example 15 coating solution was prepared as a 2.5 wt-% solution of [Lithisil™ 25 lithium silicate: compound of Preparatory Example 11 (50:50 w/w)] in water.

Preparative Example 16

Preparative Example 16 coating solution was prepared as a 2.5 wt-% solution of [Lithisil™ 25 lithium silicate: compound of Preparatory Example 12 (50:50 w/w)] in water.

Preparative Example 17

Preparative Example 17 coating solution was prepared as a 20 wt-% solution of [Lithisil™ 25 lithium silicate: compound of Preparatory Example 3 (50:50 w/w)] in water.

Example 1

For Example 1 a series of 7.6 cm×12.7 cm glass plates were coated with coating solutions prepared as described in Preparatory Examples 1-12 using a Kimwipe™ paper tissue (obtained from Kimberly Clark, Roswell, Ga.). Before coating, the glass plates were cleaned using Alconox™ detergent (obtained from Alconox, Inc., White Plains, N.J.). The coated glass plates (i.e., samples) were dried at room temperature and heated for 20 minutes at 150° C. After cooling the samples to room temperature, they were rinsed with DI water (600 mL/minute) for 30 seconds. The samples were dried with a stream of compressed air. An artificial fingerprint was applied to the coated surfaces using artificial sebum and allowed to stand for a period of time greater than 10 minutes at room temperature. The ease of removing the fingerprint from the coated surfaces was tested using a Taber™ liner abrader (obtained from Taber Industries, North Tonawanda, N.Y.) fitted with a 2.5 cm button covered with a Kimberly-Clark™ L-30 Wypall™ towel (obtained from Kimberly Clark, Roswell, Ga.) and an applied total load of 350 g. To initiate the fingerprint removal test, each sample was submitted to a 4 second exhale to generate moisture on the surface of the sample. Upon completion of the exhalation the abrader was simultaneously initiated and allowed to wipe over the fingerprint for 1 cycle (1 cycle consists of a forward wipe followed by a backward wipe). After the test was completed a fresh towel was attached for wiping the next sample. The sample was then visually inspected and rated. A rating of "Pass" means the fingerprint was mostly removed and a rating of "Fail" means the fingerprint remained and/or smeared. Table 1 summarizes the fingerprint removal test data for coatings on glass plates prepared from Preparatory Examples 1-12 coating solutions as well as an uncoated glass plate control.

TABLE 1

| Coating solution | Fingerprint removal rating |
| --- | --- |
| Preparatory Example 1 | Pass |
| Preparatory Example 2 | Pass |
| Preparatory Example 3 | Pass |
| Preparatory Example 4 | Pass |
| Preparatory Example 5 | Pass |
| Preparatory Example 6 | Pass |
| Preparatory Example 7 | Pass |
| Preparatory Example 8 | Pass |
| Preparatory Example 9 | Pass |
| Preparatory Example 10 | Pass |
| Preparatory Example 11 | Pass |
| Preparatory Example 12 | Pass |
| Uncoated glass plate control | Fail |

Examples 2-3 and Comparative Example A

For Examples 2 and 3 several stainless steel coupons were cleaned with acetone and dried under a stream of nitrogen gas. Then, the coupons were dip coated with silica nanoparticles by immersing them in NPS1 solution at a rate of 18 millimeters per minute (mm/min), allowing them remain in the coating solution for 20 seconds, and removing at 18 mm/min rate. The samples were dried at room temperature, and then were heated at 150° C. for 10 minutes. The samples were subsequently dipped into coating solution of Preparatory Example 3 (for Example 2) or coating solution of Preparatory Example 11 (for Example 3) in the same manner as that used for forming silica nanoparticle coatings. The samples were allowed to dry at room temperature before a final heat treatment at 150° C. for 10 minutes. For Comparative Example A, the stainless steel coupons were cleaned with acetone and dried under a stream of nitrogen gas but, were not coated.

Examples 4-5 and Comparative Example B

For Examples 4 and 5, several aluminum coupons were cleaned with acetone and dried under a stream of nitrogen. Next, the coupons were submerged into a 4 wt % solution of $H_2SO_4$ for 30 minutes. The samples were rinsed with DI water and dried with a stream of nitrogen. Then, the coupons were dip coated with silica nanoparticles by immersing them in NPS1 solution at a rate of 18 mm/min, allowing them remain in the coating solution for 20 seconds, and removing at 18 mm/min rate. The samples were dried at room temperature, and then were heated at 150° C. for 10 minutes. The samples were subsequently dipped into coating solution of Preparatory Example 3 (for Example 4) or coating solution of Preparatory Example 11 (for Example 5) in the same manner as that used for forming silica nanoparticle coatings. The samples were allowed to dry at room temperature before a final heat treatment at 150° C. for 10 minutes. For Comparative Example B, the aluminum coupons were cleaned with acetone and dried under a stream of nitrogen gas but, were not further treated or coated.

Examples 6-7 and Comparative Example C

For Examples 6 and 7, several PET films were coated with silica nanoparticles by using NPS1 solution and a Meyer rod (#6), and allowing the coated films dry at room temperature before heat treating for 15 minutes at 150° C. The samples were subsequently coated with coating solution of Preparatory Example 3 (for Example 6) or coating solution of Preparatory Example 11 (for Example 7) in the same manner as that used for forming silica nanoparticle coatings. The coated films were dried at room temperature before a final heat treatment of 150° C. for 10 minutes. For Comparative Example C, the PET films were not coated.

Examples 8-9 and Comparative Example D

For Examples 8 and 9, several PC plates were coated with silica nanoparticles by using NPS2 solution and a Meyer rod (#6), and allowing the coated films dry at room temperature before heat treating for 15 minutes at 150° C. The samples were subsequently coated with coating solution of Preparatory Example 3 (for Example 8) or coating solution of Preparatory Example 13 (for Example 9) in the same manner as that used for forming silica nanoparticle coatings. The coated PC plates were dried at room temperature before a final heat treatment of 150° C. for 10 minutes. For Comparative Example C, the PC plates were not coated.

The samples from Examples 2-9 and Comparative Examples A-D were tested for their cleanability (of fingerprints) as well as the durability of the coatings for maintaining their easy cleanability (of fingerprints). For the test, a facial oil fingerprint was applied to the coated surfaces of samples from Examples 2-9 and Comparative Examples A-D using facial oil and the samples were allowed to stand for a period of time less than 5 minutes at room temperature. Then, the samples were wiped with a facial paper tissue (Surpass™ Facial Tissue from Kimberly Clark, Roswell, Ga.) immediately after breathing on the samples. Removal of the fingerprints was visually examined. If the fingerprint was not removed no further testing was done for that sample. If the fingerprint was removed successfully, then those samples were further tested by rinsing the surface with DI water and visually determining if the water formed a continuous film (i.e., hydrophilic coating). If the water formed a continuous film, then the sample was further tested for durability of the coatings by using the test method described above in Example 1. After each cycle of the test, a facial oil fingerprint was reapplied on the sample and the test was repeated. Total number of cycles that the fingerprint was successfully removed was determined for each of Examples 2-9 samples and reported below in Table 2. For Comparative Examples A-D the number of cycles was zero since the fingerprints were not easy to remove from them.

TABLE 2

| Example | Durability (cycles) |
| --- | --- |
| 2 | >20 |
| 3 | >20 |
| Comparative A | 0 |
| 4 | >20 |
| 5 | >20 |
| Comparative B | 0 |
| 6 | >20 |
| 7 | >20 |
| Comparative C | 0 |
| 8 | >20 |
| 9 | >20 |
| Comparative D | 0 |

Examples 10-12 and Comparative E

For Examples 10-12, several PET films were coated with silica nanoparticles by using NPS3 solution and a Meyer rod (#6), and allowing the coated films dry at room temperature before heat treating for 15 minutes at 150° C. The samples were subsequently coated with coating solution of Preparatory Example 14 (for Example 10), coating solution of Preparatory Example 15 (for Example 11) or coating solution of Preparatory Example 16 (for Example 12) in the same manner as that used for forming silica nanoparticle coatings. The coated PET films were dried at room temperature before a final heat treatment of 150° C. for 10 minutes. For Comparative Example E, the PET films were not coated.

The samples from Examples 10-12 were tested for their cleanability (of fingerprints). For the test, a facial oil fingerprint was applied to the coated surfaces of samples from Examples 10-12 using facial oil and the samples were allowed to stand for a period of time less than 5 minutes at room temperature. Then, the samples were wiped with a facial paper tissue (Surpass™ Facial Tissue from Kimberly Clark, Roswell, Ga.) immediately after breathing on the samples. Removal of the fingerprints was visually examined. If the fingerprint was removed successfully, then those samples were further tested by rinsing the surface with DI water and visually determining if the water formed a continuous film (i.e., hydrophilic coating). A rating of "Pass" means the fingerprint was mostly removed and a rating of "Fail" means the fingerprint remained and/or smeared.

TABLE 3

| Example | Fingerprint removal rating |
| --- | --- |
| 10 | Pass |
| 11 | Pass |
| 12 | Pass |
| Comparative E | Fail |

Example 13

For Example 13 a series of stainless steel plates were coated with coating solution prepared as described in Preparatory Examples 17 using a Kimwipe™ paper tissue (obtained from Kimberly Clark, Roswell, Ga.). Before coating, the stainless steel plates were cleaned using Alconox™ detergent (obtained from Alconox, Inc., White Plains, N.J.). The coated stainless steel plates (i.e., samples) were dried at room temperature and heated for 30 minutes at 150° C.

The sample from Example 13 was tested for its cleanability (of fingerprints) as well as the durability of the coatings for maintaining their easy cleanability (of fingerprints). For the test, a facial oil fingerprint was applied to the coated surface of the sample from Example 13 using facial oil and the sample was allowed to stand for a period of time less than 5 minutes at room temperature. Then, the sample was wiped with a facial paper tissue (Surpass' Facial Tissue from Kimberly Clark, Roswell, Ga.) immediately after breathing on the samples. Removal of the fingerprints was visually examined. If the fingerprint was not removed no further testing was done for that sample. If the fingerprint was removed successfully, then the sample was further tested by rinsing the surface with DI water and visually determining if the water formed a continuous film (i.e., hydrophilic coating). If the water formed a continuous film, then the sample was further tested for durability of the coatings by using the test method described above in Example 1. After each cycle of the test, a facial oil fingerprint was reapplied on the sample and the test was repeated. For Example 13 samples, the fingerprint was successfully removed for more than 20 cycles.

The complete disclosures of the patents, patent documents, and publications cited herein are incorporated by reference in their entirety as if each were individually incorporated. Various modifications and alterations to this invention will become apparent to those skilled in the art without departing from the scope and spirit of this invention. It should be understood that this invention is not intended to be unduly limited by the illustrative embodiments and examples set forth herein and that such examples and embodiments are presented by way of example only with the scope of the invention intended to be limited only by the claims set forth herein as follows.

What is claimed is:

1. A coating composition comprising:
(a) a non-zwitterionic compound of the following Formula (I):

$$[(MO)(Q_n)Si(XCH_2SO_3^-)_{3-n}]Y_{2/nr}^{+r} \quad (I)$$

wherein:
each Q is independently selected from hydroxyl, alkyl groups containing from 1 to 4 carbon atoms and alkoxy groups containing from 1 to 4 carbon atoms;
M is selected from hydrogen, alkali metals, and organic cations of strong organic bases having an average molecular weight of less than 150 and a pKa of greater than 11;
X is an organic linking group;
Y is selected from hydrogen, alkaline earth metals, organic cations of protonated weak bases having an average molecular weight of less than 200 and a pKa of less than 11, alkali metals, and organic cations of strong organic bases having an average molecular weight of less than 150 and a pKa of greater than 11, provided that M is hydrogen when Y is selected from hydrogen, alkaline earth metals and organic cations of said protonated weak bases;
r is equal to the valence of Y; and
n is 1 or 2;
(b) alcohol and/or water; and
(c) a tetraalkoxysilane, oligomers thereof, lithium silicate, sodium silicate, potassium silicate, silica, or combinations thereof.

2. The coating composition of claim 1, wherein the non-zwitterionic compound comprises at least one of:

$(HO)_3Si-CH_2CH_2CH_2-O-CH_2-CH(OH)-CH_2SO_3^-H^+$;

$(HO)_3Si-CH_2CH(OH)-CH_2SO_3^-H^+$;

$(HO)_3Si-CH_2CH_2CH_2SO_3^-H^+$;

$(HO)_3Si-C_6H_4-CH_2CH_2SO_3^-H^+$;

$(HO)_2Si-[CH_2CH_2SO_3^-H^+]_2$;

$(HO)-Si(CH_3)_2-CH_2CH_2SO_3^-H^+$;

$(NaO)(HO)_2Si-CH_2CH_2CH_2-O-CH_2-CH(OH)-CH_2SO_3^-Na^+$; or $(HO)_3Si-CH_2CH_2SO_3^-K^+$.

3. The coating composition of claim 1, wherein the coating composition comprises no greater than 20 wt % of the non-zwitterionic compound.

4. The coating composition of claim 1, wherein the coating composition comprises 0.1 to 20 wt % of the tetraalkoxysilane, oligomers thereof, lithium silicate, sodium silicate, potassium silicate, silica, or combinations thereof.

* * * * *